United States Patent
Buckley et al.

[11] Patent Number: 5,853,082
[45] Date of Patent: Dec. 29, 1998

[54] CONVEYING TOBACCO

[75] Inventors: Peter James Buckley, Elston, Great Britain; Barbara Carol Klammer, Hong Kong, Hong Kong; Ian Ernest Tatham, Purley, Great Britain

[73] Assignee: British-American Tobacco Company Limited, Middlesex, England

[21] Appl. No.: 651,993

[22] Filed: May 21, 1996

[30] Foreign Application Priority Data

May 24, 1995 [GB] United Kingdom ................ 9511677.8

[51] Int. Cl.⁶ .................................................. B65G 27/32
[52] U.S. Cl. ............................................. 198/752; 198/464
[58] Field of Search ............................... 198/752.1, 758, 198/759, 762, 764, 753, 766

[56] References Cited

U.S. PATENT DOCUMENTS

| | | |
|---|---|---|
| 2,385,328 | 9/1945 | Brown et al. ...................... 198/762 X |
| 3,087,602 | 4/1963 | Hinkle, Jr. ............................... 198/759 |
| 3,365,054 | 1/1968 | Loveless ................................. 198/764 |
| 3,716,130 | 2/1973 | Morris ..................................... 198/762 |
| 4,287,056 | 9/1981 | Dumbaugh et al. ................ 198/762 X |
| 5,462,155 | 10/1995 | Demar et al. .................... 198/752.1 X |

*Primary Examiner*—James R. Bidwell
*Attorney, Agent, or Firm*—Kane, Dalsimer, Sullivan, Kurucz, Levy, Eisele and Richard

[57] ABSTRACT

Particulate tobacco is conveyed by a conveyor comprising a resiliently mounted conveyor tray and out-of-balance motors mounted to the tray. An index of performance of, for example $$80 \times 10^3 \frac{kg}{kW \cdot hr}$$

is achievable.

9 Claims, 2 Drawing Sheets

CONVEYING TOBACCO

BACKGROUND OF THE INVENTION

1. Field of the Invention

The subject invention relates to the conveyance of particulate tobacco.

2. Brief Description of Related Art

In the preparation of tobacco for the manufacture of cigarettes, lamina and stem components of tobacco leaf are subjected to a number of processes, typically including moistening, cutting, drying and blending. The tobacco is commonly fed from one processing unit to the next by means of balanced vibratory conveyors. In these conveyors the conveyor tray is positively oscillated by means of a crank mechanism, the stroke of the conveyor tray being twice the radius of the crank. These conveyors comprise a reaction mass and the weight ratio of the reaction mass to the conveyor tray is typically of the order of seven.

It is an object of the subject invention to provide a new and much improved mode of conveying particulate tobacco.

The term "particulate tobacco" as used herein includes lamina, stem, expanded tobacco, reconstituted tobacco and blends of any of these.

SUMMARY OF THE INVENTION

The subject invention provides a method of conveying particulate tobacco, wherein particulate tobacco is conveyed by a conveyor comprising support means, a conveyor tray, which tray is resiliently mounted of said support means, and vibration motor means, which motor means is mounted with said tray, and said tray is oscillated at a frequency of about 400 cycles per minute or more and at a projected angle to the horizontal of at least about 25 degrees under action of said motor means.

DETAILED DESCRIPTION OF THE INVENTION

Figure 1:
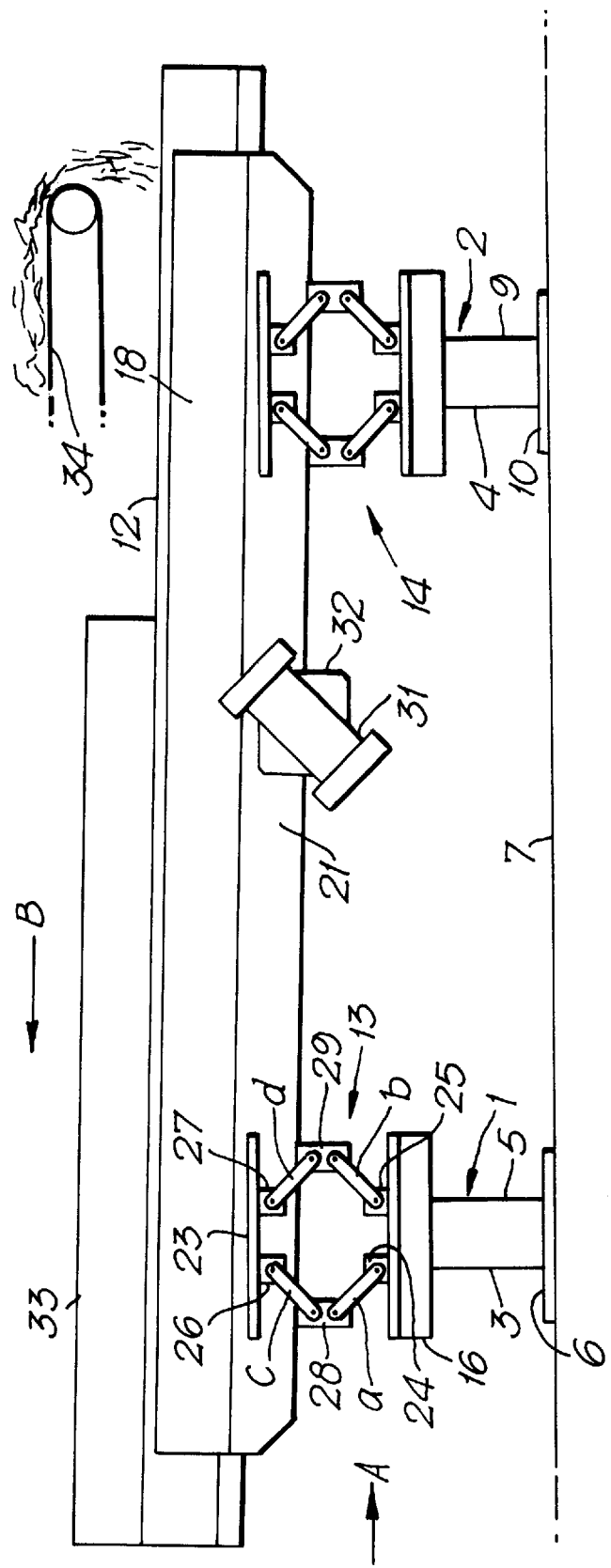

The support means may advantageously take the form of first and second pedestal means spaced apart longitudinally of the conveyor. Such first and second pedestal means may be located at respective end zones of the conveyor.

The tray should be mounted of the support means by resilient mounting means permitting oscillatory motion of the tray relative to the support means both with a component in a direction longitudinal of the tray and a component in a direction perpendicular to the longitudinal direction.

Advantageously, the conveyor comprises first and second resilient mounting means, by which the tray is mounted of the support means, the mounting means being at first and second locations respectively, which locations are spaced apart longitudinally of the conveyor by a distance which represents a major proportion of the length of the conveyor tray.

Preferably, the vibration motor means is out-of-balance, i.e. eccentric weight, vibration motor means.

In a suitable arrangement two, counter rotating vibration motors are used, these being located one to each side of the conveyor tray. Alternatively, two vibration motors, in side-by-side relationship, could be mounted over or beneath the tray. It is also conceivable for a single vibration motor to be used, the single motor being mounted over or beneath the tray and symmetrical of the longitudinal centre line of the tray.

It is much to be preferred that the vibration motor means is rigidly mounted of the conveyor tray, thus to oscillate with and at the same frequency as the tray.

Preferably, the frequency of the oscillatory conveying motion is at or about 500 cycles per minute or more. Suitably, the frequency is at or about 600 cycles or more, and even more suitably the frequency is at or about 700 cycles per minute or more. The frequency may even exceed 900 cycles per minute, e.g. 1500 cycles per minute.

The projected angle of the conveying motion is suitably at or about 45 degrees to the horizontal if the conveyor tray is disposed at or near the horizontal. If the tray is upwardly inclined (in the conveying direction), the projected angle may be up to 60 degrees, or even 70 degrees, to the horizontal.

The stroke of the oscillatory motion of the conveyor tray, as measured in the line of the aforesaid projected angle, is suitably 20 mm or less. More suitably the stroke is 15 mm or less, and even more suitably the stroke is 10 mm or less. The stroke may even be as low as about 2 mm.

The conveyor tray may be disposed horizontally or at an upward inclination of up to, for example, 25 degrees to the horizontal.

The conveyor tray may comprise, in transverse section, a horizontal conveying surface and, at the lateral edges of the conveying surface, upwardly extending wall means. According to an alternative construction, the conveyor tray may comprise, in transverse section, a conveying surface of generally U-shape.

The conveying surface of the conveyor tray may be transversely serrated. Alternatively, the conveying surface may be at least substantially smooth, even in a case in which the tray is inclined to the horizontal in the conveying direction.

If the particulate tobacco passes to the conveyor from a tobacco processing unit which unit causes the temperature of the tobacco to be in excess of ambient and/or maintains the tobacco temperature at such a value, the conveyor may comprise, or be associated with, tobacco cooling means. Thus, for example, cooling means may be provided which is operable to direct cooling air downwardly onto the tobacco on the conveyor tray, or cooling means may comprise a plenum chamber below the conveyor tray and the tray may comprise openings through which cooling air may be directed, from the plenum chamber, up into the tobacco on the conveyor tray. In the latter case the means defining the plenum chamber may be secured to the tray for movement with the tray.

In another application of the inventive method, tobacco is fed by means of the conveyor to a tobacco cutting machine of the type in the operation of which tobacco is fed as a compressed "cheese" to moving cutter blades. According to this application, a lesser projected angle is selected such that in a forward movement of the tray, particles of tobacco are moved forwards by a distance less than the distance which would obtain with a greater projected angle. Thus, for example, if the tray is disposed horizontally, the projected angle selected is less than 45 degrees; it may, for example, be in the range of 25 to 30 degrees.

The conveying surface of the conveyor tray may comprise openings therethrough, whereby smaller particles of the particulate tobacco are removed from the bed of tobacco conveyed by the conveyor.

It is possible in accordance with the subject inventive method to convey, for a given power input to the vibration motor means, a significantly greater weight of tobacco per unit time than is the case in a conventional method of conveying tobacco with a balanced vibratory conveyor of similar tray width.

By way of example of operation of the inventive method 10,000 Kg per hour (or more) of a tobacco filler blend of cut lamina and cut stem can be conveyed between one processing unit and another when a horizontal, flat tray conveyor of 600 mm tray width is employed.

Also by way of example of the inventive method, for a horizontal, flat tray conveyor conveying cut tobacco, an index of performance in excess of $$40 \times 10^3 \frac{\text{kg}}{\text{kW} \cdot \text{hr}}, \text{of}$$

$$80 \times 10^3 \frac{\text{kg}}{\text{kW} \cdot \text{hr}}$$

for instance, may be achieved over a range of tray widths of 600 mm to 1200 mm.

Similarly, for climbing conveyors with tray widths of 600 m to 1200 m, the inventive method can yield an index of performance in excess of $$30 \times 10^3 \frac{\text{kg}}{\text{kW} \cdot \text{hr}}, \text{of}$$

$$60 \times 10^3 \frac{\text{kg}}{\text{kW} \cdot \text{hr}},$$

for instance.

Marked advantages over the conventional method of conveying tobacco are obtainable by use of the subject invention when the material to be conveyed is tobacco stem (expanded or unexpanded), expanded cut lamina and blends of cut stem and cut lamina.

Figure 2:
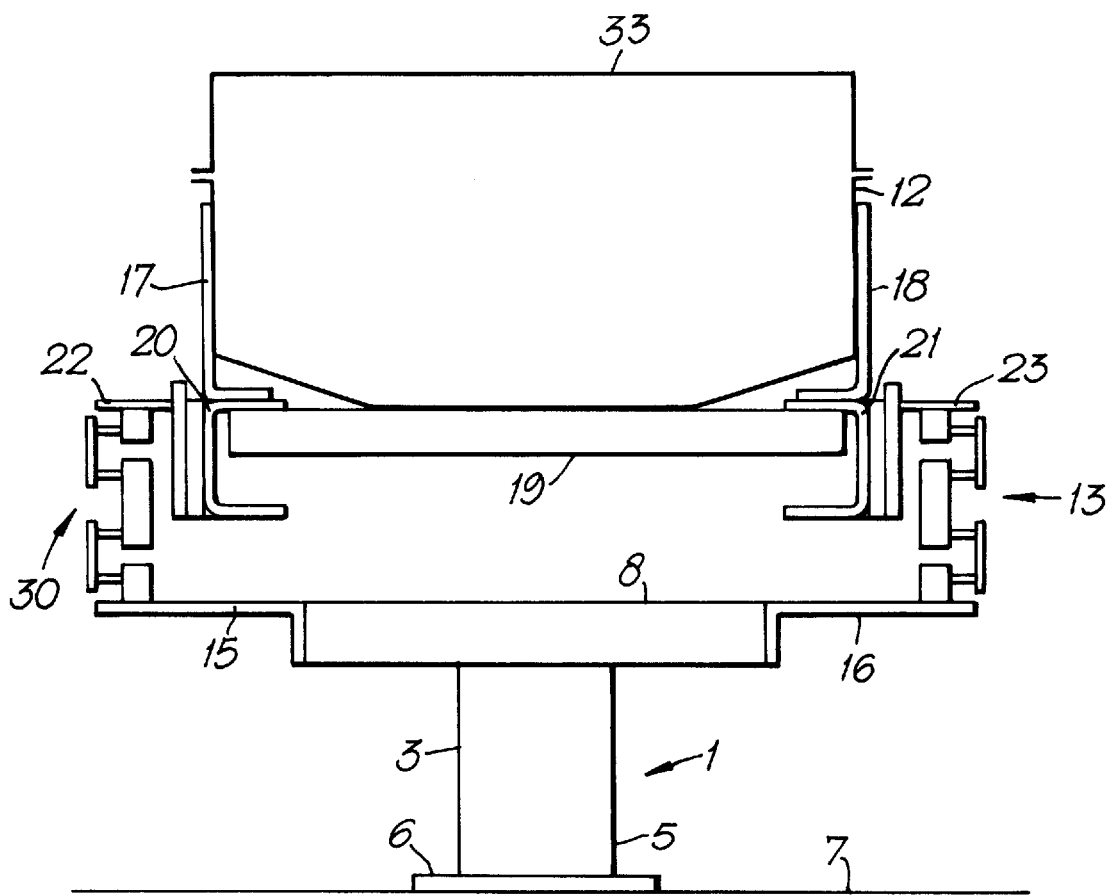

In order that the subject invention may be clearly understood and readily carried into effect reference will now be made, by way of example, to the accompanying drawing, in which:

FIG. 1 shows an elevational view of a conveyor; and
FIG. 2 shows an end view of the conveyor of FIG. 1 in the direction of arrow A.

The conveyor of FIG. 1 comprises first and second support means 1 and 2. Each of the mounting means 1, 2 comprises a pedestal, these being designated by reference numerals 3 and 4 respectively. The pedestal 3 comprises a vertically extending column 5, a base plate 6, fixedly secured to floor 7, and an upper cross beam 8 (see FIG. 2). Similarly, pedestal 4 comprises a vertically extending column 9, a base plate 10, fixedly secured to the floor 7, and a cross beam (not shown) as per cross beam 8 of pedestal 3.

The conveyor further comprises a conveyor tray 12, which tray 12 is mounted of the pedestals 3,4 by way of resilient mounting means, generally designated by reference numerals 13 and 14, as will now be described in further detail.

Fixedly secured at either end of cross beam 8 are brackets 15 and 16. Longitudinally extending side stiffening members 17 and 18 are secured one to each side of conveyor tray 12 at lower locations of the tray 12. A number of transverse tray support beam members, four say, are positioned beneath the tray 12 and are equi-spaced of the length of the tray 12. In FIG. 2 one of these beams, designated 19 is shown. Secured at respective ends of the beams of which 19 is representative are channel sections 20 and 21 which extend longitudinal of the tray 12. As can be seen from FIG. 2, the vertical components of side stiffening member 17 and channel section 20 are aligned and, similarly, the vertical components of the side stiffening member 18 and channel section 21 are aligned. Secured to the channel sections 20 and 21 respectively are brackets 22 and 23.

The resilient mounting means 13 comprises housings 24 and 25 fixedly secured to the bracket 16 and housings 26 and 27 fixedly secured to the bracket 23. The resilient mounting means 13 further comprises four links a–d. At each end of each link extend, perpendicularly to the plan of FIG. 1, pins of square cross section (not shown). The pins to the lower ends of links a and b extend through housings 24 and 25, whereas the pins at the upper ends of links c and d extend through the housings 26 and 27. The pins at the upper ends of links a and b and the pins at the lower ends of links c and d extend through housings 28 and 29. Within each of the aforesaid housings the aforesaid pins are packed about with elastomeric, torsionally resistant material.

As will be readily appreciated by those skilled in the art, the resilient mounting means at the other side of the conveyor, designated by reference numeral 30 in FIG. 2, is of the same construction as has just been described with reference to mounting means 13. Also, the mounting means 14 (FIG. 1) is of similar construction, as is mounting means corresponding with mounting means 14 at the other side of the conveyor.

To each side of the conveyor there is fixedly mounted an out-of-balance vibration motor. One of these motors, designated 31, is shown in FIG. 1. Motor 31 is rigidly mounted to channel section 21 by way of a mounting plate 32. The motor to the other side of the conveyor is correspondingly mounted, by way of a mounting plate (not shown), to channel section 20. A rigid tubular beam (not shown) extends between and is secured to each of the mounting plates.

As can be observed from FIG. 1, the conveyor tray 12 has a slight upward incline in the direction of conveyance (arrow B). As can also be observed from FIG. 1, the motor 31 is mounted at an angle of 45 degrees to the horizontal, thus to provide for a projected angle, in the direction of conveyance, of 45 degrees to the horizontal. The accompanying motor on the other side of the conveyor is mounted at the same angle of 45 degrees to the horizontal.

A hood 33 is mounted with the conveyor tray 12 for the purpose of containing any dust fraction of the conveyed tobacco.

A tobacco supply belt conveyor 34 is provided at the upstream end of the conveyor.

When the two vibration motors, which are arranged to be counter rotating, are actuated, the conveyor tray 12 (together with the two motors) is caused to vibrate at, for example, 960 cycles per minute and with, for example, a stroke of 16 mm in the line of the projected angle. When thereafter cut tobacco is fed by conveyor 34 to the upstream end of the tray 12, the tobacco is conveyed efficiently to the downstream end of the tray 12.

As can be seen from FIG. 1, the vibration motors are orientated at 45° to the horizontal. By reversing the orientation of the motors, i.e. by swinging each through 90°, it is possible to reverse the direction of conveyance of the tobacco. The motors may be orientation reversed manually or by remotely controlled powered actuator means.

We claim:

1. A method of conveying particulate tobacco, wherein particulate tobacco is conveyed by a conveyor comprising support means, a conveyor tray, which tray is resiliently mounted of said support means, and vibration motor means, which motor means is mounted with said tray, and said tray is oscillated at a frequency of about 400 cycles per minute or more and at a projected angle to the horizontal of at least about 25 degrees under action of said motor means, and wherein if said tray is disposed horizontally the index of performance is at least $40 \times 10^3$ kg tobacco/kW·hr and if said tray is inclined to the horizontal the index of performance is at least $30 \times 10^3$ kg tobacco/kW·hr.

2. A method according to claim 1, wherein said particulate tobacco is conveyed by said conveyor intermediate the processing of said tobacco in a processing unit and the entry of said tobacco into the next processing unit.

3. A method according to claim 1, wherein said motor means is out-of-balance vibration motor means.

4. A method according to claim 1, wherein said motor means is rigidly mounted of said conveyor tray.

5. A method according to claim 1, wherein the stroke of the oscillatory conveying motion as measured in the line of said projected angle is 20 mm or less.

6. A method according to claim 5, wherein said stroke is 15 mm or less.

7. A method according to claim 6, wherein said stroke is 10 mm or less.

8. A method according to claim 1, wherein said tray is disposed horizontally and the index of performance is at least $$60 \times 10^3 \left[ \frac{kg}{kW \cdot hr} \right] \frac{kg\ tabacco}{kW \cdot hr}.$$

9. A method according to claim 1, wherein said tray is inclined to the horizontal and the index of performance is at least $$45 \times 10^3 \left[ \frac{kg}{kW \cdot hr} \right] \frac{kg\ tabacco}{kW \cdot hr}.$$

* * * * *